(12) United States Patent
Baud et al.

(10) Patent No.: US 11,972,316 B2
(45) Date of Patent: Apr. 30, 2024

(54) MICROPERCUSSION MARKING SYSTEM WITH RFID

(71) Applicant: TECHNOMARK INTERNATIONAL, La Talaudiere (FR)

(72) Inventors: Laurent Albert Paul Baud, Paris (FR); Stéphane Noel Jacob, Genilac (FR)

(73) Assignee: TECHNOMARK INTERNATIONAL, La Talaudiere (FR)

( * ) Notice: Subject to any disclaimer, the term of this patent is extended or adjusted under 35 U.S.C. 154(b) by 111 days.

(21) Appl. No.: 17/435,415

(22) PCT Filed: Mar. 5, 2020

(86) PCT No.: PCT/FR2020/050450
§ 371 (c)(1),
(2) Date: Sep. 1, 2021

(87) PCT Pub. No.: WO2020/178531
PCT Pub. Date: Sep. 10, 2020

(65) Prior Publication Data
US 2022/0180077 A1    Jun. 9, 2022

(30) Foreign Application Priority Data
Mar. 5, 2019 (FR) ...................... 1902254

(51) Int. Cl.
*G06K 7/10* (2006.01)
*G06K 19/07* (2006.01)

(52) U.S. Cl.
CPC ..... *G06K 7/10366* (2013.01); *G06K 19/0723* (2013.01)

(58) Field of Classification Search
CPC ................ G06K 7/10366; G06K 19/0723
USPC ......................................... 235/451
See application file for complete search history.

(56) References Cited

U.S. PATENT DOCUMENTS

| 10,321,501 | B2 * | 6/2019 | Liu ................. G06K 1/121 |
| 2014/0184397 | A1 | 7/2014 | Volpert |
| 2016/0128798 | A1 * | 5/2016 | Bovet ........... G06K 19/07771 235/492 |
| 2019/0026510 | A1 | 1/2019 | Hall et al. |

FOREIGN PATENT DOCUMENTS

| DE | 102008025104 A1 | 12/2009 |
| EP | 1852760 A1 | 11/2007 |
| FR | 3029443 A1 | 6/2010 |

* cited by examiner

*Primary Examiner* — Michael G Lee
*Assistant Examiner* — David Tardif
(74) *Attorney, Agent, or Firm* — Nath, Goldberg & Meyer; Joshua B. Goldberg

(57) ABSTRACT

The invention relates to a marking system comprising at least one micropercussion marking machine, characterized in that it also comprises a first RFID (radiofrequency identification) means fitted to said marking machine, a second RFID means fitted to a device separate from said marking machine, said first RFID means being designed to transmit first information to said second RFID means and/or said second RFID means being designed to transmit second information to said first RFID means. The invention is particularly suitable for the micropercussion marking of industrial components or products in order to identify them and track them easily and reliably.

20 Claims, 1 Drawing Sheet

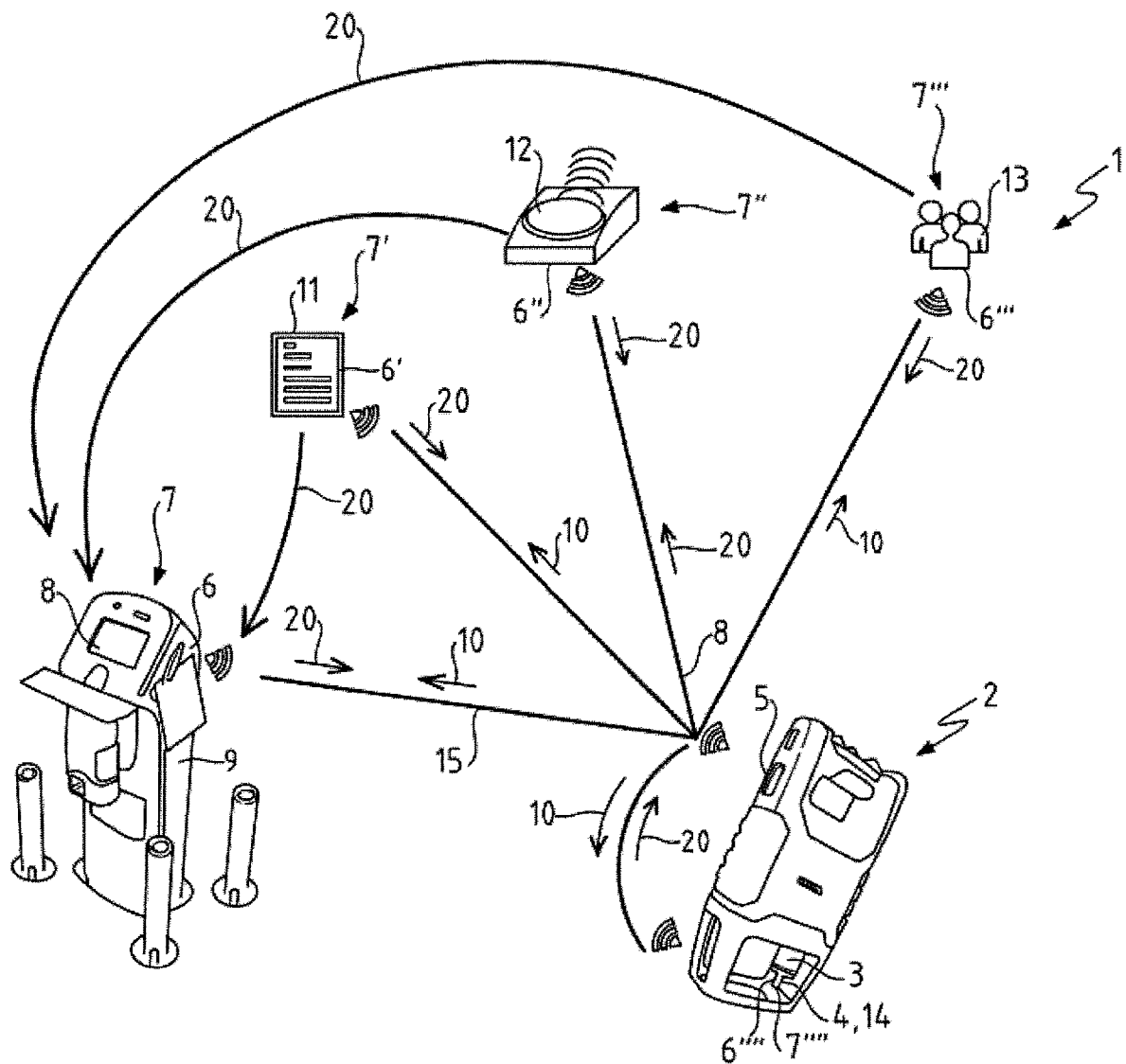

MICROPERCUSSION MARKING SYSTEM WITH RFID

This is a National Phase Application filed under 35 U.S.C. 371 as a national stage of PCT/FR2020/050450, filed Mar. 5, 2020, an application claiming the benefit of French Application No. 1902254, filed Mar. 5, 2019, the content of each of which is hereby incorporated by reference in its entirety.

TECHNICAL FIELD

The present invention concerns the general field of micro-percussion marking, and more precisely the production of micro-percussion marking in order to register one or more signs on a component, for example an industrial component.

More particularly, the invention concerns a marking system comprising at least one micro-percussion marking machine.

The invention also concerns a method for manufacturing such a marking system, as well as a method for adjusting a micro-percussion marking machine.

PRIOR TECHNIQUE

It is known to implement marking systems comprising a fixed micro-percussion marking machine near which a part to be marked is brought, or a portable micro-percussion marking machine that an operator will handle to bring it close to a part to be marked.

These known marking systems generally each comprise a respective marking machine and a respective control unit, which is connected to the machine either via a wired link and located at a distance from the latter, or mounted directly on the marking machine, and on board by the latter in the case of a portable marking machine.

The operation of these marking systems of the prior art is well known to operators, who enter and control, via the control unit, all of the marking data to be transmitted to the marking machine, for example a serial number to mark, machine configuration parameters, etc.

These systems dedicated to micro-percussion marking, although generally satisfactory in their use, nonetheless have certain drawbacks.

Thus, these known micro-percussion marking systems have significant limitations in terms of interfacing between the control box and the marking machine. When an operator wishes to modify or renew the marking data or the configuration parameters of the marking machine, the design of known marking systems makes it necessary to make one or more entries via the control unit, and this very often by an operator having to enter all the desired data alone, or several operators with different qualifications and/or authorizations, for example a first operator who will modify the percussion force of the machine in relation to the material to be marked, and a second operator who will provide information the machine on a pattern to be marked, while another operator must ensure that during the entire configuration method, each marking machine is associated with the correct box and vice versa. Such a configuration of a marking system therefore requires a large number of and/or qualified personnel and a significant implementation time, while multiplying the risk of error, since the operator alone can easily make a mistake as to one of the multiples data that must be entered, while the plurality of operators increases the heterogeneity of records and skills.

Thus, these known marking systems can lead to significant handling errors from the operators, for example when an unqualified operator himself sets the marking machine via the box to save time and avoid calling on an authorized not immediately available operator. Even more serious, the risk of making the wrong marking machine and/or box increases considerably when there is a plurality of marking machines and therefore a plurality of associated boxes on the same site, as well as a plurality of operators and/or marking instructions, this risk being further accentuated when the marking machines are portable, since it is easy to interchange two machines.

In addition, these known marking systems present the risk of associating a marking machine with the wrong box, and therefore of giving marking instructions to the box, that are impractical or unsatisfactory by the machine (that is to say not presenting the expected quality or speed for example). The reasoning is the same, mutatis mutandis, with regard to the combination of a marking machine and a removable accessory which can be mounted on it. Even by associating a control unit with a suitable marking machine, the known marking systems present a non-negligible risk for their operators of generating unsuitable machine configurations, for example by associating with a machine an inappropriate accessory for the retracted configuration, or again by registering in a machine a machine configuration which is inadequate for a certain type of marking, for a certain type of part to be marked, for the machine itself, or even simply because of human configuration errors.

In summary, it is particularly difficult, with known marking systems, to consistently associate the right marking machine with the right box, the right operator, correct marking instructions and/or an exact machine configuration.

The known marking systems also have a low level of interoperability, since it is necessary to configure each machine according to its own control box and its own machine parameters, using one or more authorized operators.

Thus, even if marking systems are known and workable as such, the aforementioned drawbacks demonstrate that they are not suitable for rapid, practical, efficient and scalable use of one or more marking machines.

Ultimately, the known micro-percussion marking systems are particularly expensive, complex and time-consuming to adjust between each marking and by each operator, and also present a high risk of marking error. They also ask to mobilize a large skilled workforce. Finally, the known micro-percussion marking systems are difficult to adapt so that they have a relatively low evolutionary character, and they are therefore difficult to use in synergy or in combination with each other, their respective elements being rarely interchangeable and/or with a high risk of error.

DISCLOSURE OF THE INVENTION

The objects assigned to the present invention therefore aim to remedy the various drawbacks listed above and to propose a new marking system which, while being particularly efficient, is particularly simple to implement, inexpensive and flexible at will.

Another object of the invention aims at providing a new marking system that is particularly easy to adapt to a new or pre-existing, fixed or movable marking machine.

Another object of the invention aims at providing a new marking system capable of effectively micro-percussion marking a large quantity of components with an extremely low risk of marking error, even in a short period of time.

Another object of the invention aims at providing a new marking system which is both reliable and economically competitive.

Another object of the invention aims at providing a new marking system authorizing the use only to authorized operators and appropriate marking configurations.

Another object of the invention aims at providing a new marking system making it possible to adapt the marking specifically to an operator, to his level of authorization and/or his functions.

Another object of the invention aims at providing a new marking system particularly suited to high marking rates.

Another object of the invention aims at providing a new marking system making it possible to set up a marking machine quickly and without risk of error.

Another object of the invention aims at providing a new marking system whose design gives it particularly flexible operation and easy to change according to the needs of operators.

Another object of the invention aims at providing a new marking system requiring little maintenance and reduced labor or at least reduced skilled labor.

Another object of the invention aims at providing a new marking system that is particularly effective and suitable for the marking of industrial components.

Another object of the invention aims at providing a new marking system making it possible to optimize the management of the authorization of an operator, as well as to strengthen the overall management of the safety of a marking machine.

Another object of the invention aims at providing a new marking system that is particularly easy to install in a structure or industrial installation under construction or already in existence.

Another object of the invention aims at providing a new system for manufacturing a marking system which is at the same time simple, inexpensive, quick and easy to implement with a limited number of different elements.

Another object of the invention aims at providing a new method for adjusting a marking machine that is easy to implement, and which allows an improvement in the speed of adjustment, that is to say of parameterization, of the machine, while guaranteeing a significant reduction in the risk of marking errors and/or machine settings.

The objects assigned to the invention are achieved by means of a marking system comprising at least one micro-percussion marking machine, characterized in that it also comprises:
  a first RFID (radio frequency identification) means equipping said marking machine,
  a second RFID means equipping a device separate from said marking machine,
  said first RFID means being adapted to transmit first information to said second RFID means and/or said second RFID means being adapted to transmit second information to said first RFID means.

The objects assigned to the invention are also achieved by means of a method for manufacturing a marking system comprising at least one micro-percussion marking machine, characterized in that it comprises:
  a first step of equipping a marking machine with a first RFID (radio frequency identification) means,
  a second step of equipping a device separate from said marking machine with a second RFID means,
  said first RFID means being adapted to transmit first information to said second RFID means and/or said second RFID means being adapted to transmit second information to said first RFID means.

The objects assigned to the invention are further achieved by means of a method for adjusting a micro-percussion marking machine, characterized in that a first RFID (radiofrequency identification) means equips said marking machine, a second RFID means equipping a device separate from said marking machine, and in that it comprises:
  a step of transmitting first information from said first RFID means to said second RFID means, and/or
  a step of transmitting second information from said second RFID means to said first RFID means.

SUMMARY DESCRIPTION OF THE DRAWINGS

Other features and advantages of the invention will appear and emerge in more detail on reading the description given below, with reference to the appended drawing, given solely by way of illustrative and non-limiting example, in which FIG. 1 is a simplified schematic illustration of a marking system with several possibilities of RFID functions according to the invention.

As illustrated in FIG. 1, the invention concerns, according to a first aspect, a marking system 1. Of course, the marking system 1 is preferably intended to mark by micro-percussion at least one part to be marked, for example a component. or an industrial product, so as to deform it to register at least one sign which is itself advantageously intended to provide an identification to distinguish said marked part from other parts also marked (preferably also thanks to the same system 1), or again group several parts together bearing the same sign(s). The marking system 1 is thus preferably designed to plastically deform by micro-percussion any type of suitable part to be marked, for example a component made of metal, polymer, wood, or any other suitable material.

BEST WAY TO MAKE THE INVENTION

According to the invention, as illustrated in FIG. 1, the marking system 1 comprises at least one micro-percussion marking machine 2. Preferably, the marking system comprises a plurality of substantially similar micro-percussion marking machines 2, that is to say equipped in the same way as what is described below.

Preferably, said marking machine 2 comprises a marking head 3 provided with a movable punch 4, which is intended to strike a part to be marked so as to deform the latter in order to register at least one sign therein, and possibly a plurality of consecutive signs, the sign or signs forming, for example, one or more serial numbers, inscriptions, brands, logos, alphanumeric characters, ornamental patterns, identification symbols, two-dimensional matrix markings-coding, in particular of the Data Matrix® type, etc.

According to the invention, the marking system 1 further comprises at least:
  a first RFID (radio frequency identification) means 5 equipping said marking machine 2, and
  a second RFID means 6, 6', 6", 6'", 6"" equipping a separate device 7, 7', 7", 7'", 7"" of said marking machine 2.

The marking system 1 advantageously comprises said separate device 7, 7', 7", 7'", 7"", which therefore preferably forms part of the marking system 1 of the invention.

The term «RFID» advantageously means «radio-identification» or even «radiofrequency identification», and preferably designates a technology for remote storage and retrieval of data using elements sometimes called «Radio tags», «markers», or RFID tags».

For example, said first RFID means 5 is an RFID tag, said second RFID means 6, 6', 6", 6'", 6"" being an RFID reader, or conversely, said second RFID means 6, 6', 6", 6'", 6"" is an RFID tag, said first RFID means 5 being an RFID reader.

According to a particular embodiment illustrated in FIG. 1, said first RFID means 5 is on board by said micro-percussion marking machine 2, and it is for example integrated within the latter. Alternatively, said first RFID means 5 is fixed (that is to say secured) on said marking machine 2. Likewise, said second RFID means 6, 6', 6", 6'", 6"" can be on board by said separate device 7, 7', 7", 7'", 7"", and/or it is for example integrated within the latter, in whole or in part. Alternatively, said second RFID means 6, 6', 6", 6'", 6"" is fixed (that is to say secured) on said separate device 7, 7', 7", 7'",

According to the invention, said first RFID means 5 is designed to transmit first information 10 to said second RFID means 6, 6', 6", 6'", 6"" and/or said second RFID means 6, 6', 6", 6'", 6"" is designed to transmit second information 20 to said first RFID means 5. Said first and/or second information 10, 20 relate for example to the micro-percussion marking of said marking machine 2, directly (marking data, configuration data, etc.) or indirectly (authorization, security, Wi-Fi™ wireless connection configuration, etc.), as will be seen below. Of course, advantageously, said first RFID means 5 is designed to receive (for example, read and/or record) said second information 20 coming from said second RFID means 6, 6', 6", 6'", 6"" and/or said second RFID means 6, 6', 6", 6'", 6"" is adapted to receive (for example, read and/or record) said first information 10 coming from said first RFID means 5. Thus, advantageously, said RFID reader is designed to read said RFID tag so as to receive RFID tag data from the latter. For example, said first RFID means 5 is an RFID reader integrated into said marking machine 2, and said second RFID means 6, 6', 6", 6'", 6"" is an RFID tag integrated into said separate device 7, 7', 7", 7'", 7"", the marking system 1 being designed so that when an operator passes said first RFID means 5 nearby (preferably a few centimeters, to a transmission distance) of said second RFID means 6, 6', 6", 6'", 6"" so that the RFID reader (the first RFID means 5) reads said RFID tag (the second RFID means 6, 6', 6", 6'", 6"") so that said second information contained in said RFID tag is picked up by said RFID reader, that is to say transmitted to said RFID reader, the latter then advantageously transmitting said second information 20 to said marking head 3.

Said RFID tag is preferably designed to store said RFID tag data, which are for example:
  pre-recorded (for example parameterization or marking data),
  coming from the environment (for example temperature), and/or coming from said RFID reader (writing tag in particular),
  and retransmitting them to said RFID reader, said RFID tag data being formed by said first information 10 and/or said second information 20.

Said RFID tag can be passive, semi-passive or active (that is to say with a battery-type energy reserve). It can be of the write type, that is to say that the marking system 1 can be designed so that said RFID reader is capable of communicating write data within said RFID tag which records them, said write data preferably being formed by said first and/or second data 10, 20.

Advantageously, said first and second RFID means 5, 6, 6', 6", 6'", 6"" are designed to be brought close to each other, preferably at a transmission distance equal to or less than a predetermined distance, so as to perform said transmission of said first and/or second information 10, 20. Thus, to perform this transmission of said first and/or second information 10, 20, that is to say in other words to establish communication between said first and second RFID means 5, 6, 6', 6", 6'", 6"" using RFID technology, it is preferably necessary to bring said first and second RFID means 5, 6, 6', 6", 6'", 6"" closer together at a relatively small distance from each other formed by said transmission distance. The latter is preferably less than 1 m, more advantageously less than 50 cm, even more advantageously less than 30 cm, and even more advantageously equal to or less than 20 cm. In other words, said predetermined distance or limit transmission distance is preferably equal to 1 m, more advantageously equal to 50 cm, even more advantageously equal to 30 cm, and even more advantageously equal to 20 cm, the transmission distance is advantageously situated between a zero distance and said predetermined distance (included or not).

Advantageously, said first and second RFID means 5, 6, 6', 6", 6'", 6"" are designed to recognize each other, the RFID tag being for example designed to recognize a read wave emitted by said RFID reader and emit a response wave, said response wave being picked up (or «read») by said RFID reader. More advantageously, said first and second RFID means 5, 6, 6', 6", 6'", 6"" are designed to pair with each other, particularly when they are brought to said transmission distance from each other.

According to a first embodiment, illustrated on the left of FIG. 1, said marking system 1 comprises a wireless connection device fitted to said marking machine 2, said wireless connection device being advantageously distinct from said first RFID means 5. In this embodiment, the first and second RFID means 5, 6 are advantageously designed to, in particular when brought to said transmission distance from one another, automatically configure, thanks to the transmission by RFID of said first and/or second information 10, 20, a wireless connection 15 between a wireless connection terminal 9, for example secured to said separate device 7 as illustrated in FIG. 1, and said marking machine 2, via said wireless connection device. Said marking system 1 therefore advantageously comprises said wireless connection terminal 9, that is to say it comprises a wireless connection terminal 9 for making a wireless connection 15 (preferably a radio connection, for example of Wi-Fi™ type or other appropriate standard) with said wireless connection device of said marking machine 2, said wireless connection 15 being preferably configured by means of the pairing of said first and second RFID means 5, 6, although it can alternatively be carried out otherwise.

Preferably, in this first embodiment, said wireless connection 15 is a radio connection, in particular a connection of the Wi-Fi™ type, said wireless connection device therefore being designed to be connected via radio communication, and in particular via Wi-Fi™ or possibly Bluetooth™, to said wireless connection terminal 9, which is then a wireless radio connection terminal (and in particular more precisely Wi-Fi™ or other appropriate standard). The marking system 1 is preferably designed to automatically configure, thanks to the pairing of said first and second RFID means 5, 6, a wireless connection 15, preferably Wi-Fi™, between said wireless connection terminal 9, optionally including a control box 8, and said wireless connection device. Said wireless connection 15 is advantageously a connection operating at a relatively long distance compared to the transmission distance, that is to say said wireless communication 15 may for example extend over a few meters or more (in particular between 0 and 20 meters), a few tens of meters or more (between 0 and 100 meters, in particular), or even a few hundred meters or more (between 0 and 600 meters, or even more). In summary, in this first embodiment, the marking system 1 is advantageously designed to allow the creation of a wireless connection 15 which is preferably «long distance», (for example a few meters to a few tens of meters) and a different type of an RFID connection (for example Wi-Fi™ or Bluetooth™), from the prior realization of an RFID connection preferably «short distance», (for example a few centimeters to one or two meters) between said first and second RFID means 5, 6. Such a configuration is particularly advantageous in the field of micro-percussion marking, because it makes it possible, for example, by minimizing the risk of error (unwanted duplicates, false numbers, incorrect pairing, etc.), to pair one or more micro-percussion marking machines 2 to the same «Wi-Fi™ spot» (allowing a «long distance» wireless connection 15) via a «short distance» RFID pairing between the first RFID means 5 of each marking machine 2 and said second RFID means 6 equipping the separate device 7, the latter possibly being in the immediate vicinity of the wireless connection terminal 9 or even connected to it. Optionally, the first and second RFID means 5, 6 are designed, when they are brought within the transmission distance from one another, to automatically deactivate the wireless connection 15. Alternatively, the marking system 1 comprises said second RFID means 6, designed specifically to configure said wireless connection 15 when brought to a transmission distance from the first RFID means 5 as mentioned above, and another second RFID means 6 distinct from the previous one and designed specifically to deactivate said connection wireless 15 when brought within the transmission distance of the first RFID means 5.

According to a particular embodiment, the marking system 1 comprises a plurality of marking machines 2, each being equipped with a respective first RFID means 5 (which is preferably as mentioned above and below) designed to communicate said first and/or second information 10, 20 with said second RFID means 6, which is therefore advantageously designed to communicate with several first RFID means 5.

Said marking system 1 preferably comprises at least one control unit 8, the latter being advantageously connected to said wireless connection terminal 9, in particular by a wireless or wired link, the assembly formed by said control unit 8 and said wireless connection terminal 9 forming for example said separate device 7, as illustrated in FIG. 1. In other words, said second RFID means 6 preferably equips connection terminal 9 and/or a structure connected to this terminal 9, said structure being for example said control unit 8. The latter can therefore optionally itself be equipped with said second RFID means 6 and form all or part of said separate device 7. Said control unit 8 is preferably designed for be able to give marking instructions to said marking machine 2, and this via said wireless connection terminal 9, said wireless connection 15 (preferably a radio connection, in particular of the Wi-Fi™ type as we have seen, but which can also be of the Bluetooth™ type, etc.) and said wireless connection device. Said wireless connection device is preferably on board, integrated in and/or fixed on said marking machine 2, and therefore makes it possible to establish said wireless connection 15, preferably between the marking head 3 and said control unit 8 via said wireless connection terminal 9 to give marking instructions to said movable punch 4. This configuration is advantageous in the ease it provides for automatically configuring a wireless connection 15 between said marking machine 2 and said wireless connection terminal 9, which can moreover constitute a full-fledged invention as such.

Preferably, the term Wi-Fi™ designates here wireless communication protocols governed by the standards of the IEEE 802.11 group (IEEE designating in particular the Institute of Electrical and Electronics Engineers).

According to a second embodiment, which can be produced in parallel or in combination with the first embodiment described above, said first information 10 and/or said second information 20 preferably comprises at least marking data. Thus, in the latter mode, said sign is advantageously derived from said second information 20. For example, as illustrated in FIG. 1, the separate device 7' comprises a tracking support 11 integrating the second RFID means 6' which is preferably an RFID tag, said tracking medium 11 making it possible to present specific marking data (forming said second data 20) for each part to be marked so that they are transmitted from said second RFID means 6' to said first RFID means 5 to be transcribed as marking instructions to said marking machine 2 and more precisely to said marking head 3. Said tracking support 11 may in particular be formed by a follower card or alternatively by a part to be marked on or within which said second RFID means is disposed. Preferably formed of an RFID tag. This configuration allows in this case a «direct reading» of the information from the second RFID means by the first RFID means (which is then preferably an RFID reader) for the «direct» marking of the parts to be marked, the marking data being in particular issued «directly» from said second information 20, in particular without configuration of a wireless connection by radio communication, in particular of the Wi-Fi™ type, as in the first embodiment.

According to a third embodiment, which can be carried out in parallel or in combination with the modes described above, said first information 10 and/or said second information 20 comprise at least data for setting up said marking machine 2. For example, in this latter mode, the separate device 7" advantageously comprises a configuration badge 12 making it possible to configure said marking machine 2 via said second information 20. Said configuration badge 12 is advantageously designed to be presented at said transmission distance so that the second RFID means 6", preferably integrated into said configuration badge 12, transmits said second information 20 to said first RFID means 5, so that said marking machine 2 modifies its marking parameters according to said parameter data contained in said second information 20. The marking parameters of said machine 2 and/or the parameter data contained in said configuration badge 12 may for example relate to the size and nature of the marking fonts, the application force of the movable punch 4, information relating to the material to be marked, the marking speed, the spacing of the micro-percussions, etc. This configuration is particularly useful for automatically configuring the marking parameters of a marking machine 2, without resorting to manual intervention by an operator, for example on a control box.

According to a fourth embodiment, which can be produced in parallel or in combination with the modes described above, the separate device 7''' comprises an identification badge 13 specific to the identity of an operator, said second information 20 being specific to the latter, as illustrated schematically in FIG. 1. For example, said identification badge 13 comprises, as second information 20, marking authorization information, which, when transmitted from said second RFID means 6''' said first RFID means 5, making it possible to authorize or not a marking operation according to the authorization of the operator. In other words, said identification badge 13 makes it possible, for example, to authorize or prohibit an operator from carrying out a certain marking operation. This configuration is particularly advantageous when it comes to having a particular micro-percussion marking carried out or authorized by a qualified operator. The identification badge 13, and more generally the marking system 1 of the invention, thus advantageously makes it possible to personalize the implementation of the marking machine 2, by adapting according to the profile of the operator, its authorization and/or its function the marking parameters and/or the marking data to be transmitted to the marking machine 2 via RFID.

Alternatively, or in combination with the above, the separate device 7, 7', 7", 7'", 7"" comprises a zone badge, in which the second RFID means 6, 6', 6", 6'", 6"" comprises second information which, when transmitted to said first RFID means 5, cause zone action from said marking machine 2, such as an alarm or deactivation. The reactivation can for example be carried out using said identification badge 13. This configuration is particularly useful for preventing the theft of a marking machine 2 or quite simply an inappropriate use of the machine 2, for example in an zone not dedicated to marking.

According to a fifth embodiment, which can be produced in parallel or in combination with the methods described above, the marking system 1 comprises one or more specific accessories 14, each accessory 14 being intended to equip said marking machine 2 by micro-percussion to provide it with a respective functionality relating to marking. Thus, advantageously, according to this fifth embodiment, said marking accessory 14 forms the separate device 7'" and is intended to equip said marking machine 2 in a removable manner. Preferably, the second RFID means 6"" is mounted on said or within said marking accessory 14 so as to transmit said setting data to said marking machine 2 via said first RFID means 5, said setting data being specific to said accessory 14. Of course, the configuration data advantageously form at least part of said second information 20. For example, said removable marking accessory 14 is formed by a movable punch 4. In this case, said marking accessory 14 removable is distinct from said marking machine 2 on the one hand because it is distinct from the bulk of said marking machine 2, that is to say it comprises less than 10% of the total weight of this last, and the other because it is detachable (since removable) from said marking machine 2. For example, said second RFID means 6"" is integrated within or fixed on said removable accessory 14, the latter forming both said punch mobile 4 intended for micro-percussion marking and said separate device 7"", and said accessory 14 is then designed to communicate said second information 20 to the marking head 3 of said marking machine 2 so as to configure the latter according to the setting data comprised in said second information 20. This embodiment makes it possible to automatically configure said marking machine 2 with a marking accessory 14, without the intervention of an operator to carry out the adjustment.

According to an alternative compatible with the embodiments described above, in particular in combination, the marking system 1 comprises a plurality of second RFID means 6, 6', 6", 6'", 6"" each equipping a respective separate device 7, 7', 7", 7'", 7"" of said marking machine 2, the marking system 1 therefore advantageously comprising a plurality of separate devices 7, 7', 7", 7'", 7"". According to this alternative, said first RFID means 5 is designed to be able to transmit said first information 10 to each second RFID means 6, 6', 6", 6'", 6"" and/or each second RFID means 6, 6', 6", 6'", 6"" is designed to be able to transmit respective second information to said first RFID means 5. Advantageously, at least a first 6 and a second 6', 6", 6'", 6"" of said second RFID means 6, 6', 6", 6'", 6"" are designed to pair with each other in order to transmit second information 20 from the first 6', 6", 6'", 6"" of said second RFID means 6, 6', 6", 6'", 6"" to the second 6 of said second RFID means 6, 6', 6", 6'", 6"', which is designed to be able to transmit said second information 20 to said connection terminal 9, itself being designed to transmit said second information 20 to said marking machine 2 via said wireless connection 15 preferably of the Wi-Fi™ or other radio standard type. Preferably, said first 6', 6", 6'", 6"" and second 6 of said second RFID means 6, 6', 6", 6'", 6"" respectively equip a first 7', 7", 7'", 7"" and a second 7 of said separate devices 7, 7', 7", 7'", 7"", said first separate device 7', 7", 7'", 7"" being for example formed by said tracking support 11, said configuration badge 12, said identification badge 13, or said zone badge (or even said accessory 14), while said second separate device 7 is formed by said wireless connection terminal 9 itself or a structure connected to this terminal 9. Thus, it is for example possible, thanks to this embodiment, to configure the marking machine 2 using the configuration badge 12 directly by pairing the second RFID means 6" fitted to the configuration badge 12 with the first RFID means 5 fitted to the marking machine 2, or by pairing the second RFID means 6" fitted to the configuration badge 12 with the second RFID means 6 equipping the wireless connection terminal 9 or a structure (for example the control unit 8) connected to this terminal 9, the wireless connection terminal 9 then transmitting the second data 20 coming from the configuration badge 12 to the marking machine 2 via the wireless connection 15, preferably of the Wi-Fi™ type. This embodiment is particularly advantageous, since it makes it possible to carry out a «remote» RFID data communication to the marking machine 2, without necessarily putting said first and second RFID means 5, 6, 6', 6", 6'", 6"" at a transmission distance from each other via the wireless connection 15, in particular of the Wi-Fi™ type and therefore at long distance compared to RFID, that is to say without bringing the marking machine 2 closer to the separate device 7, 7', 7", 7'", 7"".

According to yet another embodiment, which can be produced in parallel or in combination with the embodiments described above, and not illustrated here, said separate device 7, 7', 7", 7'", 7"" is a control box designed to generate marking data and transmit them to said second RFID means 6, 6', 6", 6'", 6"" so that the latter in turn retransmits them to said first RFID means 5 as second information 20.

The invention concerns, according to a second aspect, a method for manufacturing a marking system 1 comprising at least one micro-percussion marking machine 2 (preferably as described above). The manufacturing method is therefore advantageously aimed at producing the marking system 1 described above.

Thus, preferably, the preceding description concerning the marking system 1 therefore also applies to the manufacturing method of the invention, and vice versa.

According to the invention, the manufacturing method comprises:

a first step of equipping a marking machine 2 with a first RFID means (radio frequency identification) 5, a second step of equipping a separate device 7, 7', 7", 7'", 7"" of said marking machine 2 with a second RFID means 6, 6', 6", 6'", 6"", said first RFID means 5 being adapted to transmit first information 10 to said second RFID means 6, 6', 6", 6'", 6"" and/or said second RFID means 6, 6', 6", 6'", 6"" being designed to transmit second information to said first RFID means 5. The transmitting step is preferably carried out when said first and second RFID means 5, 6, 6', 6", 6'", 6"" are positioned by an operator at a transmission distance, which is preferably that already mentioned above.

The invention concerns, according to a third aspect, a method of adjusting a micro-percussion marking machine 2, preferably as described above. Preferably, the adjustment method is therefore carried out using a marking system 1 as described above. Thus, preferably, the following description concerning the marking system 1 and/or the marking machine 2 therefore also applies to the adjustment method of the invention, and vice versa.

Thus, according to the invention, a first RFID (radio frequency identification) means 5 equips said marking machine 2, and a second RFID means 6, 6', 6", 6'", 6"" equips a separate device 7, 7', 7", 7'", 7"" of said marking machine 2.

Still according to the invention, the adjustment method comprises:
- a step of transmitting first information 10 from said first RFID means 5 to said second RFID means 6, 6', 6", 6'", 6"", and/or
- a step of transmitting second information 20 from said second RFID means 6, 6', 6", 6'", 6"" to said first RFID means 5.

Preferably, as described above, said first information 10 and/or said second information 20 comprises at least parameter data of said marking machine 2.

According to a particular embodiment, the adjustment method comprises a step of making a wireless connection 15, the latter advantageously being different from an RFID connection. Thus, said implementation step comprises bringing said first and second RFID means 5, 6 closer together so that they are brought at a transmission distance from one another to configure automatically, thanks to the transmission by RFID of said first and/or second information 10, 20, said wireless connection 15 between a wireless connection terminal 9 and said marking machine 2 via a wireless link device, the latter being separate from said first RFID means 5. The wireless connection terminal 9 can then advantageously transfer marking information directly to said marking machine 2 via said wireless connection 15.

POSSIBILITY OF INDUSTRIAL APPLICATION

The system 1 of the invention, as well as advantageously the manufacturing method and the related adjustment method, are particularly suitable for carrying out, using at least one marking machine, the micro-percussion marking of a certain number of industrial components in a safe, flexible, fast, and simple manner, while minimizing the risk of duplication, the risk of marking error, the risk of manual operator error, and/or the risk that an unauthorized operator uses the marking machine.

The invention claimed is:

1. A marking system (1) comprising at least one micro-percussion marking machine, characterized in that it also comprises:
   - a first RFID (radio frequency identification) means (5) attached to said at least one micro-percussion marking machine (2),
   - a second RFID means (6, 6', 6", 6'", 6"") attached to a separate device (7, 7', 7", 7'", 7"") of said at least one micro-percussion marking machine (2), said first RFID means (5) transmitting first information (10) to said second RFID means (6, 6', 6", 6'", 6"") and/or said second RFID means (6, 6', 6", 6'", 6"") transmitting second information (20) to said first RFID means (5).

2. The marking system (1) according to claim 1, characterized in that said first and second RFID means (5, 6, 6', 6", 6'", 6"") pair with each other.

3. The marking system (1) according to claim 1 characterized in that said first and second RFID means (5, 6, 6', 6", 6'", 6"") when brought into proximity to each other at a transmission distance equal to or less than a predetermined distance effect said transmission of said first and/or second information (10, 20).

4. The marking system (1) according to claim 3, characterized in that it comprises a wireless connection device attached to said at least one micro-percussion marking machine (2), said wireless connection device being separate from said first RFID means (5), said first and second RFID means (5, 6), when brought to said transmission distance from each other, automatically configure, by means of RFID transmission of said first and/or second information (10, 20), a wireless connection (15) between a wireless connection terminal (9) and said at least one micro-percussion marking machine (2) via said wireless connection device.

5. The marking system (1) according to claim 1, characterized in that said first information (10) and/or second information (20) comprises at least marking data.

6. The marking system (1) according to claim 5, characterized in that the separate device (7') comprises a tracking support (11) incorporating the second RFID means (6') which is an RFID tag, said tracking support (11) presenting specific marking data for each part to be marked so that they are transmitted from said second RFID means (6') to said first RFID means (5) to be transcribed as instructions of marking to said at least one micro-percussion marking machine.

7. The marking system (1) according to claim 1, characterized in that said first information (10) and/or said second information (20) comprise at least parameter data of said at least one micro-percussion marking machine (2).

8. The marking system (1) according to claim 7, characterized in that said separate device (7") comprises a configuration badge (12) which configures said at least one micro-percussion marking machine (2) via said second information (20).

9. The marking system (1) according to claim 1, characterized in that said separate device (7'") comprises an identification badge (13) specific to the identity of an operator, said second information (20) being specific to the latter.

10. The marking system (1) according to claim 1, characterized in that it comprises one or more specific accessories (14), each accessory attached to said at least one micro-percussion marking machine (2) to provide it with a respective functionality relating to marking.

11. The marking system (1) according to claim 10, characterized in that said marking accessory (14) forms the separate device (7") and is attached to said at least one micro-percussion marking machine (2) in a removable manner.

12. The marking system (1) according to claim 11, characterized in that the second RFID means (6") is mounted on said or within said marking accessory (14) and transmits said parameter data to said at least one micro-percussion marking machine (2) via said first RFID means (5), said parameter data being specific to said marking accessory (14).

13. The marking system (1) according to claim 1, characterized in that said separate device (7, 7', 7", 7''', 7'''') is a control unit which generates marking data and transmits them to said second RFID means (6, 6', 6", 6''', 6'''') so that the latter in turn retransmits them to said first RFID means (5) as second information (20).

14. The marking system (1) according to claim 1, characterized in that said at least one micro-percussion marking machine (2) comprises a respective marking head (3) provided with a movable punch (4), for striking a part to be marked to deform the latter in order to register at least one sign therein.

15. The marking system (1) according to claim 14, characterized in that said sign comes from said second information (20).

16. The marking system (1) according to claim 1, characterized in that said first RFID means (5) is an RFID tag, said second RFID means (6, 6', 6", 6''', 6'''') is an RFID reader, or vice versa in that said second RFID means (6, 6', 6", 6''', 6'''') is an RFID tag, said first RFID means (5) is an RFID reader.

17. The marking system (1) according to claim 16, characterized in that said RFID reader reads said RFID tag to receive RFID tag data from the latter.

18. The marking system (1) according to claim 16, characterized in that said RFID tag stores said RFID tag data, which are:
pre-recorded,
coming from a surrounding environment;
and/or coming from said RFID reader, and retransmitting them to said RFID reader, said RFID tag data being formed by said first information (10) and/or said second information (20).

19. A method for manufacturing a marking system (1) comprising at least one micro-percussion marking machine (2), characterized in that it also comprises:
a first step of attaching to said at least one micro-percussion marking machine (2), a first RFID (radio frequency identification) means (5),
a second step of attaching to a separate device (7, 7', 7", 7''', 7'''') of said at least one micro-percussion marking machine (2) [with] a second RFID means (6, 6', 6", 6''', 6''''),
said first RFID means (5) transmitting first information (10) to said second RFID means (6, 6', 6", 6''', 6'''') and/or said second RFID means (6, 6', 6", 6''', 6'''') transmitting second information (20) to said first RFID means (5).

20. A method for adjusting a micro-percussion marking machine (2), characterized in that a first RFID (radio frequency identification) means (5) is attached to said micro-percussion marking machine (2), a second RFID means (6, 6', 6", 6''', 6'''') is attached to a device separate (7, 7', 7", 7''', 7'''') from said micro-percussion marking machine (2), comprising:
a step of transmitting first information (10) from said first RFID means (5) to said second RFID means (6, 6', 6", 6''', 6''''), and/or
a step of transmitting second information (20) for said second RFID means (6, 6', 6", 6''', 6'''') to said first RFID means (5).

* * * * *